[11] 3,583,561

[72] Inventors: Mordechai Wiesler, Lexington; Virgil Martinonis, Gloucester; John S. MacIntyre, Lynnfield, all of Mass.
[21] Appl. No. 785,269
[22] Filed Dec. 19, 1968
[45] Patented June 8, 1971
[73] Assignee Transistor Automation Corporation, Woburn, Mass.

[54] DIE SORTING SYSTEM
11 Claims, 16 Drawing Figs.

[52] U.S. Cl. .................................. 209/73, 29/413, 29/574, 324/158
[51] Int. Cl. .................................. B07c 1/00
[50] Field of Search .................................. 346/108; 209/72—75, 111.7, 81; 29/583, 413, 574; 324/158 P

[56] References Cited
UNITED STATES PATENTS
| | | | |
|---|---|---|---|
| 2,970,730 | 2/1961 | Schwarz | 29/413UX |
| 3,216,004 | 11/1965 | Herriott | 346/108X |
| 3,461,537 | 8/1969 | Lotz | 29/583X |

OTHER REFERENCES
Druschel, W. O.; "Semiconductor Chip Tester and Sorter"; February 1964; IBM Technical Disclosure Bulletin Vol. 6, No. 9, pp. 53, 54.

Primary Examiner—Richard A. Schacher
Attorney—Morse, Altman & Oates

ABSTRACT: A wafer of semiconductor devices is tested to determine the quality of each device. The test data with respect to each die is electro-optically encoded and photographically recorded in a pattern corresponding to the die pattern on the wafer. Upon completion of the testing and recording operations the wafer is scored, mounted on a flexible pressure-sensitive adhesive web and broken so as to separate the dies from one another while maintaining their original orientation. The dice and their respective test record are then mounted on a common frame, side-by-side, so that each die and its test data are readily matched. The frame is then mounted on a die-sorting mechanism comprised of an XY indexing table which indexes the wafer die by die through a removal station and the film indexed through an electro-optical reader where the test data is read out to designate the die to a selected delivery station.

INVENTORS
MORDECHAI WIESLER
VIRGIL MARTINONIS
JOHN S. MACINTYRE

BY *Morse, Altman & Oates*

ATTORNEYS

PATENTED JUN 8 1971 3,583,561

INVENTORS
MORDECHAI WIESLER
VIRGIL MARTINONIS
JOHN S. MACINTYRE

BY Morse, Altman + Oates

ATTORNEYS

INVENTORS
MORDECHAI WIESLER
VIRGIL MARTINONIS
JOHN S. MACINTYRE

BY *Morse, Altman & Oates*

ATTORNEYS

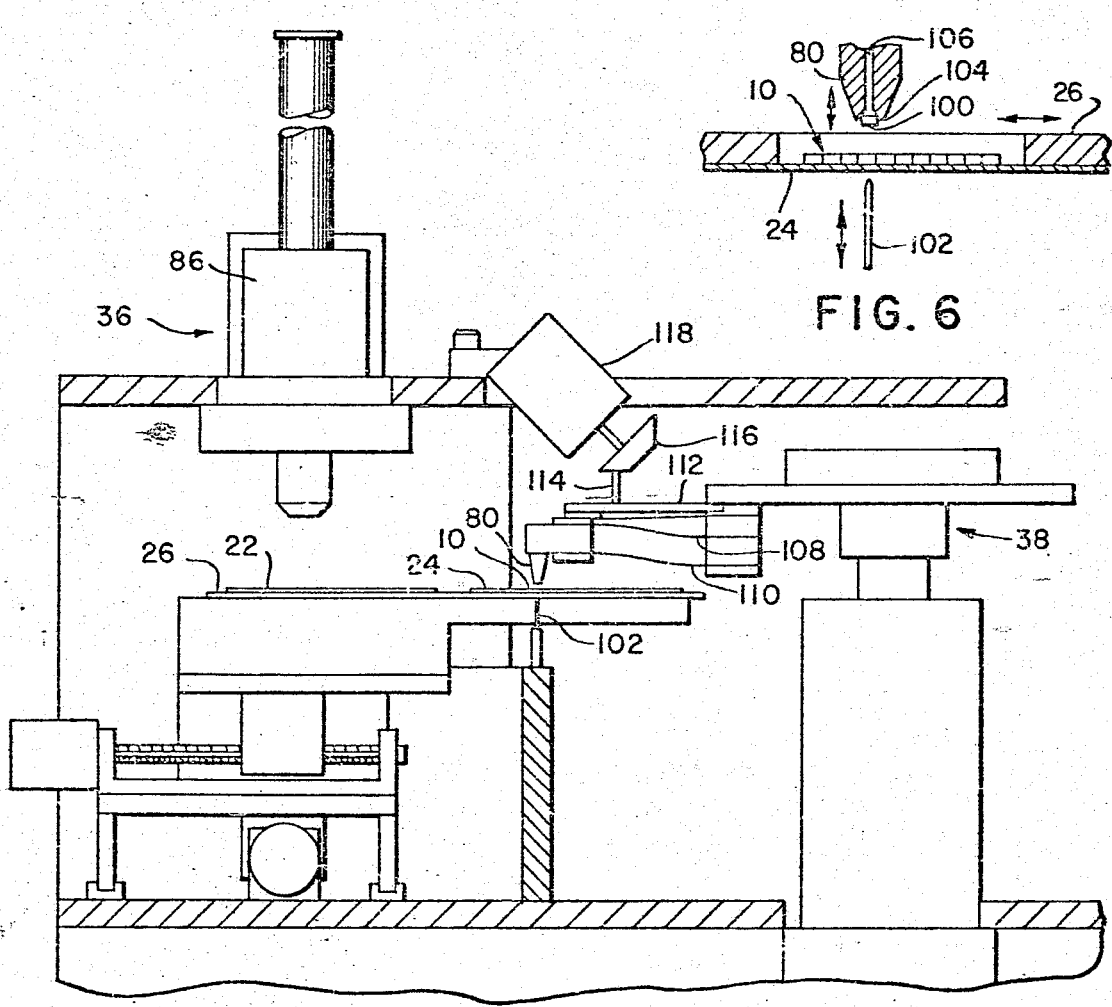
FIG. 6
FIG. 5
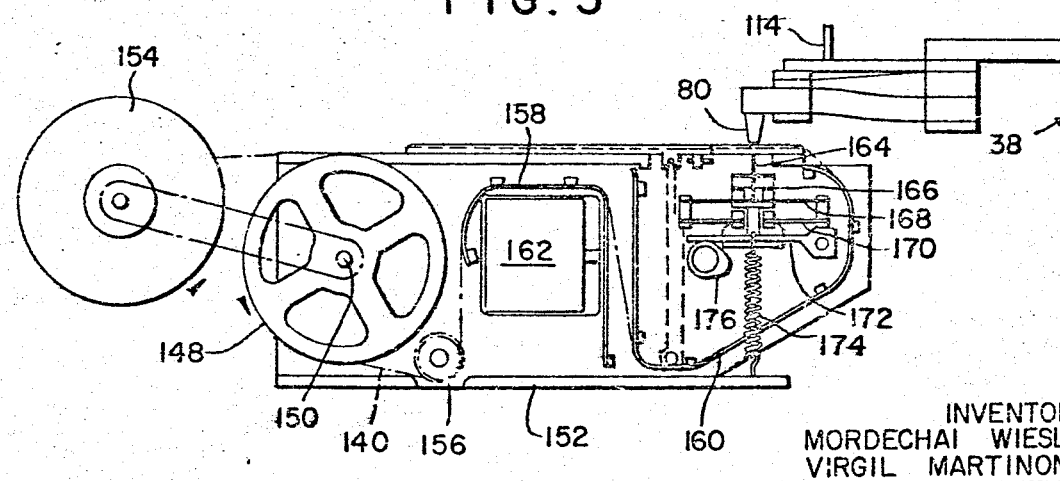
FIG. 7
INVENTORS
MORDECHAI WIESLER
VIRGIL MARTINONIS
JOHN S. MACINTYRE
ATTORNEYS

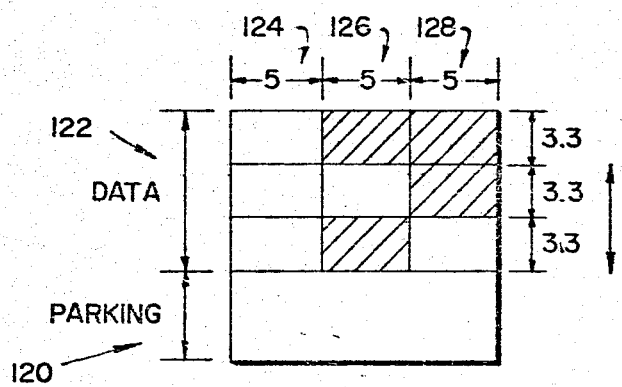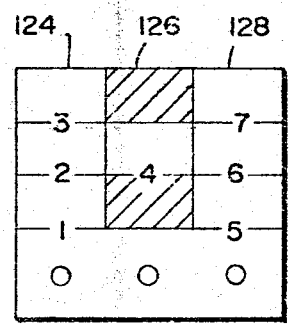
FIG. 9  FIG. 10
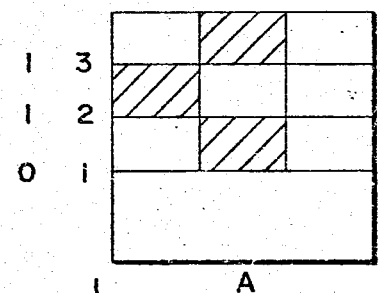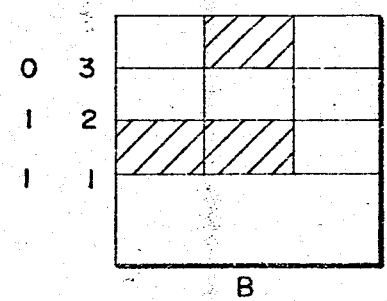
FIG. 11
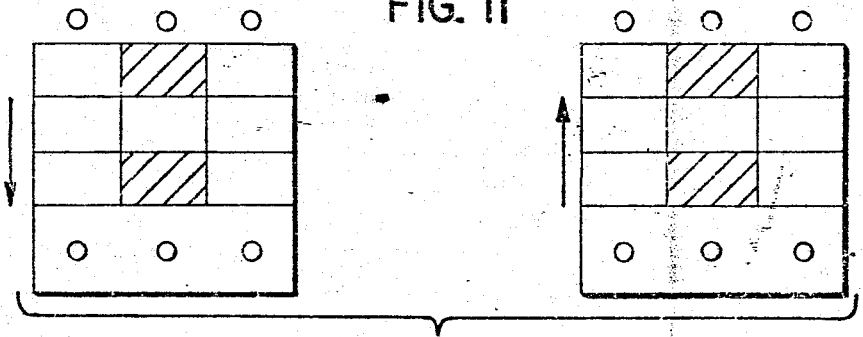
FIG. 12
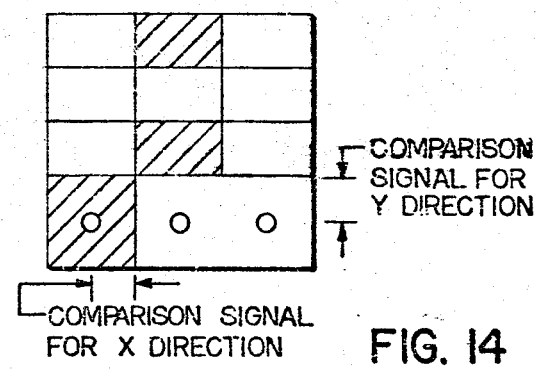
FIG. 13
FIG. 14
INVENTORS
MORDECHAI WIESLER
VIRGIL MARTINONIS
JOHN S. MACINTYRE
BY
ATTORNEYS

DIE SORTING SYSTEM

BACKGROUND OF THE INVENTION

1. Field of the Invention

This invention relates generally to the classification and sorting of individual semiconductive devices from monolithic wafers and more particularly is directed towards a new and improved method and associated apparatus for testing, sorting and packaging semiconductive dice from monolithic wafers.

2. History of the Prior Art

In the production of semiconductive devices from a monolithic wafer it has been necessary, by reason of the imperfect state of the art; to test and divide the dies from one wafer into categories of varying qualities and characteristics. While all devices on a given wafer are designed and intended to be identical, in practice a rather wide variation appears in the quality of the when tested. Heretofore, the sorting of the dies according to their characteristics was carried out in various ways. One such technique involved testing and marking each device with ink in a color code and then physically sorting the dies according to the color coding. Other techniques also have been employed but none have been entirely satisfactory from the standpoint of speed of operation, cost and overall efficiency. Accordingly, it is an object of the present invention to provide a new and improved method and associated apparatus for quickly, accurately and efficiently sorting individual semiconductive devices from a monolithic wafer.

SUMMARY OF THE INVENTION

This invention features a method of sorting semiconductive devices from a monolithic wafer, comprising the steps of testing each device in the wafer, electro-optically encoding the test data and preparing a photographic record thereof, mounting the wafer on a pressure-sensitive web then breaking the wafer so as to separate individual devices into dies while maintaining their orientation, then mounting the wafer with its supporting film on a frame together with the coded record. The frame is electro-optically read and the output signals employed to deliver each device to a preselected station where devices of common characteristics are stored, packaged or the like.

This invention also features associated apparatus for sorting devices including an electro-optical system for producing a photographic record pattern in coded form corresponding to the characteristics of each die, a mounting and alignment station by which the wafer and film are mounted in side-by-side registration and an electro-optical reading instrument by which the coded pattern on the film is read out to produce appropriate driving signals for the sorting the apparatus. The sorting apparatus includes a novel separation apparatus for removing devices from the wafer film comprising cooperating and reciprocating vacuum collet and needle by which individual devices are separated from the film and an indexing table for depositing the devices at selected stations.

BRIEF DESCRIPTION OF THE DRAWINGS

FIG. 5 is a view in end elevation of the sorting apparatus showing the film-reading apparatus of FIG. 4 plus details of the mechanism for removing individual dies from the pressure sensitive web, FIG. 6 is a cross-sectional view showing details of the pickoff mechanism of FIG. 5 on an enlarged scale, FIG. 7 is a view in side elevation of the indexing mechanism which may be employed at each delivery station and made in accordance with the invention.

DETAILED DESCRIPTION OF THE PREFERRED EMBODIMENT

General

Figure 1:
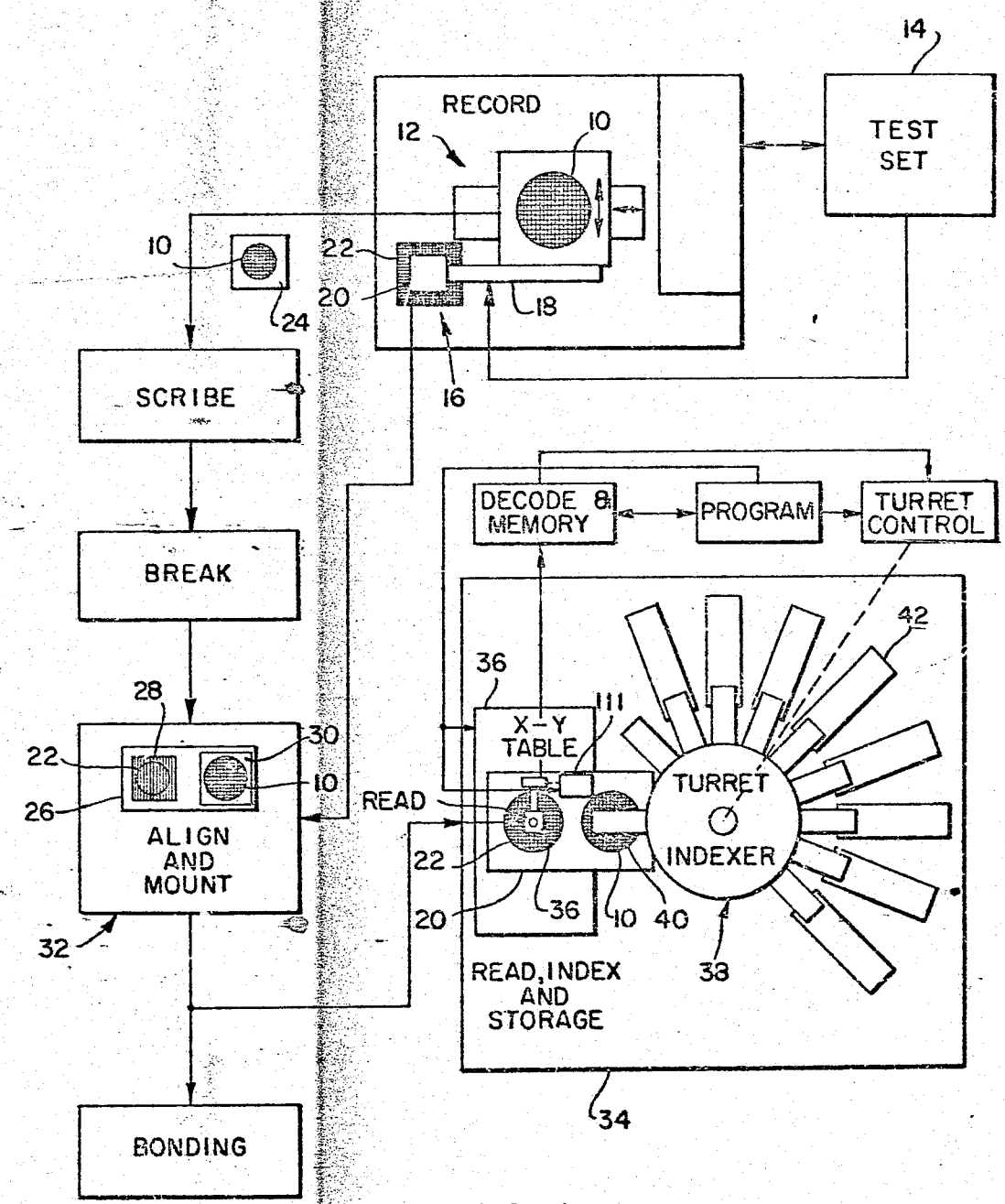
FIG. 1 is a somewhat schematic diagram of a die-sorting system made according to the invention.

Referring now to the drawings and particularly to FIG. 1, a general description of the system will be given by way of introduction.

A monolithic wafer 10, comprised of a grid array of small semiconductive devices formed thereon, is mounted as by a vacuum chuck on the upper face of an XY indexing table 12 adapted to move the wafer incrementally along mutually perpendicular X and Y axes so that by probes and associated test equipment, which are known in the art, each device may be tested to determine its particular operating characteristics and quality, and for this purpose a test set, generally indicated by block 14, is employed. Such test sets are commercially available and form no part of this invention per se. Test data from the set 14 are electro-optically encoded by an electro-optical recording instrument 16 to be described more fully in conjunction with FIG. 2. In general, this instrument includes a member 18 extending from the XY table 12 so that it moves together with the wafer as it is indexed. The member carries an optical head 20 which is adapted to project onto a photographic film 22 a pattern that is coded in accordance with the test data obtained from the test set with respect to each individual circuit which as been probed. Since the film 22 is fixed in position the head 20 will index in the same manner as the wafer 10 producing multiple photographic images in a gridlike pattern, each image containing a photographic code corresponding to the characteristics of a particular circuit device in the wafer 10. When all of the devices in the wafer 10 have been probed and a photographic record has been made of the film 22, the wafer 10 is removed from the XY table and mounted on the adhesive face of a pressure sensitive adhesive web 24. The wafer is then scribed so as to form score lines in a grid pattern between each device on the wafer. The wafer is then broken into individual dies as by passing the wafer and film over an edge as disclosed in copending application Ser. No. 665,635 entitled "Method and Apparatus For Sorting Semiconductive Devices" filed Sept. 5, 1967, now U.S. Pat. No. 3,497,948 dated Mar. 3, 1970, assigned to the same assignee. The dies are broken from one another while remaining attached to the web in their original position and orientation. The film 22, in the meantime, is developed and both the photographic film 22 and web 26, with the wafer 10, are mounted in side-by-side alignment to a frame 26 formed with suitable apertures 28 and 30. The photographic film and dice are assembled to the frame by an alignment and mounting instrument generally indicated in block form in FIG. 1 and shown in greater detail in FIG. 3. Once the components are assembled in precise relation so that the position of a particular die corresponds exactly with its corresponding photographic code on the film 22, the frame is transferred to a die-sorting instrument generally indicated in block form 34 in FIG. 1 and shown in more detail in FIGS. 4, 5, 6 and 7. The die-sorter includes second XY table 36 to which the frame 26 is mounted. The sorter includes an electro-optical reading instrument, best shown in FIG. 4, including a stationary optical head 36 which reads each coded pattern on the film 22 as the frame 26 is indexed by the XY table. The XY table is located adjacent a transfer turret 38 having a plurality of radial pickoff heads 40 which remove individual dies from the pressure-sensitive web 24 and, in accordance with instructions fed from the electro-optical reader, delivers each die to one of a plurality of radial delivery stations 42, which may have an automatic packaging unit, each station collecting dies having the same characteristics. Alternatively the sorted dies may be delivered directly to a die-bonding machine thereby avoiding the packaging requirements.

Electro-Optical Recorder

Figure 2A:
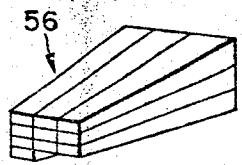
FIG. 2a is a view in perspective of the optically encoding matrix of FIG. 2.
Figure 2:
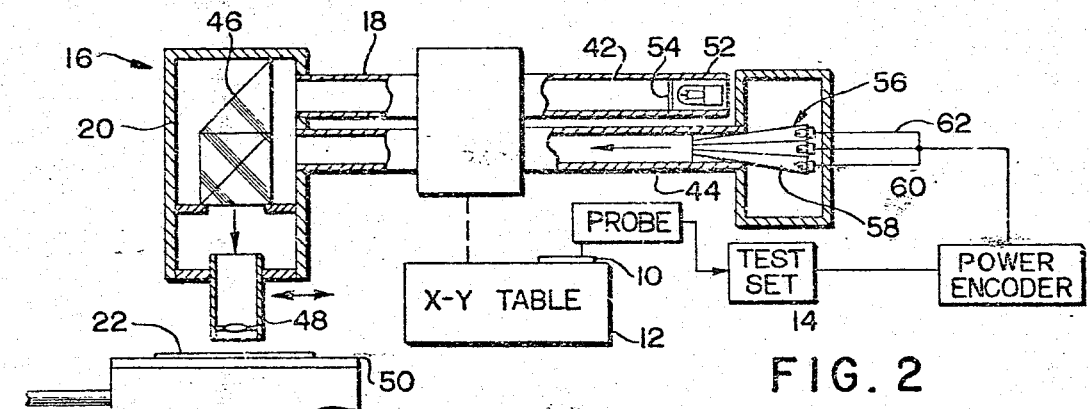
FIG. 2 is a cross-sectional view in side elevation, somewhat schematic, of an electro-optical system for producing a photographic record of test data and made in accordance with the invention.

Referring now to FIG. 2 of the drawings, the electro-optical recording instrument 16 will now be described in detail. The recording instrument includes the extension member 18 which is comprised of a pair of parallel tubes 42 and 44 rigidly secured to the XY table 12 so as to move in unison with the wafer 10 as it is probed. The tubes 42 and 44 are fixed rigidly at one end to the optical head 20. At their opposite ends the tubes are connected to independent light sources adapted to project separate images along parallel paths to a beam-splitter 46 mounted in the optical head and adapted to direct the images in a reduced size downwardly through a lens 48 onto the photographic film 22. The film 22 preferably is mounted to a fixed vacuum chuck 50 adapted to hold the film flat against the planar supporting upper surface of the chuck.

The tube 42, as viewed in FIG. 2, at its right-hand end is provided with a bulb 52 which is adapted to project a reference image 54 onto the chuck surface 50 for focusing purposes only.

The tube 44 is provided with an electro-optical encoding unit 56 focused along the tube towards the beam splitter. This unit is comprised of a bundle of light pipes 58 tapered towards the beam splitter and typically ten in number in a grouping such as shown in FIG. 2a. Each of the light pipes is provided at its right-hand end with an individual light source such as a bulb 60 or the like. Each of the bulbs 60 is connected by a lead 62 to a power source 64 which in turn is controlled by the output from the test set 14. Test set 14, as previously described, is operatively connected to the probe so that information derived as to the operating characteristics of each semiconductive device in the wafer 10 will be fed from the test set encoded to the power source so as to illuminate the bulbs 56 in selective patterns or coding arrangements corresponding to the particular characteristics of the devices tested on the wafer. It will be understood that by illuminating certain one or more of the bulbs 56, various code combinations may be produced which will be projected onto the film 22.

The projected image of the code pattern preferably has a perimeter that is equal to or smaller than the area size of the device that has been tested. As the probe indexes the wafer from die to die the electro-optical encoder records the appropriate coded pattern on the film, the pattern corresponding to the test results of the respective die. Since the film record is made at the same time as the test, the arrangement of the coded test results on the film is similar to the grid arrangement of the devices on the wafer. The film, therefore, provides the test result of every device on the wafer in a corresponding arrangement. Typically, the ratio of the film to the wafer is one to one. The film 22 is, of course, mounted within a light type enclosure which, for sake of clarity, has not been illustrated.

Figure 2B:
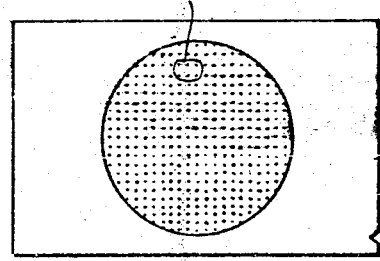
FIG. 2b is a plan view of a typical film record of the test data of a wafer.

When the testing of the wafer has been completed and a photographic record made of each and every device in the wafer, the film 22 is developed. The film 22 may be conventional photographic film or may be in the form of quick developing film such as sold by Polaroid Corporation. In FIG. 2b there is illustrated a plan view of a typical photographic record of the coded data corresponding to a wafer produced by the FIG. 2 instrument. FIG. 2b also shows a portion of the film greatly enlarged to show details of the code pattern. It will be understood that for each tested device the recording pattern for that device will be comprised of a group of 10 blocks 66 and in each group of blocks some will be clear while others will be opaque providing a code which subsequently will serve in a sorting instrument mechanism.

Mounting and Alignment Station

Figure 3:
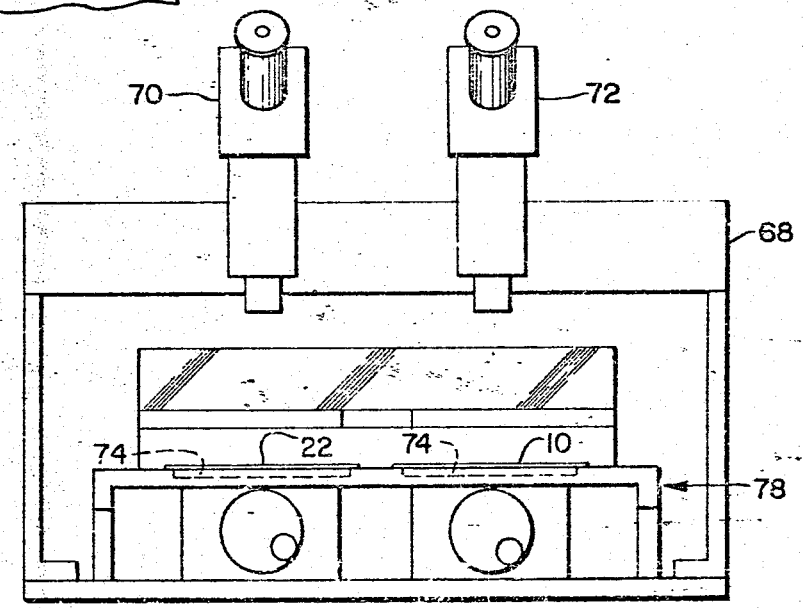
FIG. 3 is a view in front elevation of an alignment apparatus made according to the invention.

The exposed and developed film 22 is next mounted to the frame 26 in side-by-side relation with the now divided dies which are held in their original orientation by means of the pressure sensitive web 24 to which they have been transferred. The instrument employed for the mounting and alignment station is best shown in FIG. 3 and is comprised of a fixed frame 68 having a horizontal cross support to which are mounted spaced magnifying viewers 70 and 72, each adapted to register one with the dies and the other with the film.

Mounted below the viewers 70 and 72 is a vacuum chuck 74 carried by a manually operative positioning table 78 which is also angularly adjustable whereby the photographic record and the circuit dies may be aligned precisely with one another and, when properly aligned, transferred to the mounting frame 26. In practice, the dies on the web are oriented into position and transferred to the mounting frame then the film record is oriented in a similar manner in relation to the dies and thereupon transferred to the mounting frame. The relative positions of the wafer dies and the test record on the mounting frame are such that at a fixed distance of X and Y from any die, a reader can pick up the test results for that particular die.

Die-Sorting Station

Figure 4:
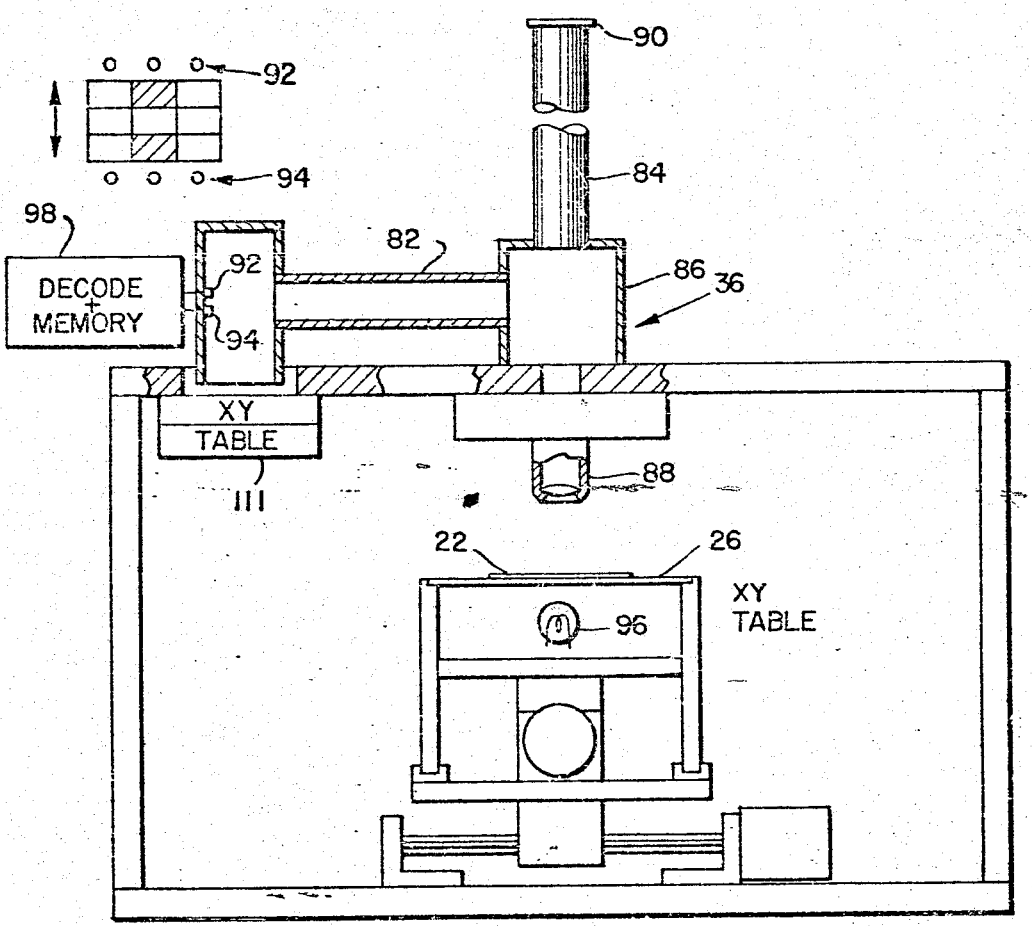
FIG. 4 is a view in side elevation, partly in section, of a film-reading apparatus made in accordance with the invention.

The mounted photographic record and dice array carried by the frame 26 are then transferred to the die-sorting apparatus 34, best shown in FIGS. 4, 5 and 6. The die sorter basically comprises the XY indexing table 36 on which the mounting frame 26, supporting the correctly oriented dice and film record, is mounted; the optical reading head 36 for reading the coded data on the film 22; and the sorting turret 38 equipped with a plurality of vacuum collets 80. The XY table indexes in the same fashion as the XY table 12 for the recording instrument, indexing from one device and one code image to the next. It will be understood that the mounting frame 26 moves so that the photographic record and the dies index in unison. The mounting frame is positioned so that the film record is located in optical alignment with the optical reading head 36 while the dies are located in position opposite a pickoff collet 80.

The optical head 36 is comprised of a pair of mutually perpendicularly tubes 82 and 84 extending from a beam splitter 86 located above a lens 88 focused on the coded film 22. The upper end of the tube 84 is provided with an eye piece 90 having a crosshair reticle and is used for visual alignment purposes. At the left-hand end of the tube 82, as viewed in FIG. 4, are two banks of photodiodes 92 and 94 which serve to convert a projected image of the photographic code to usable electrical signals. This coded image is projected by means of a light source, such as a bulb 96, located below the film 22 along the optical axis of the lens 88. As the film 22 is indexed onto the optical axis of the lens 88 the coded pattern, which corresponds to a particular die in the corresponding relative position amongst the group of dies, will be projected against the photodiodes which will generate an electrical signal corresponding to the quality and characteristics of the particular die. These electrical signals are fed to a shift register memory 98. Programmed data will stop the XY table 36 and a vacuum collet 80 will pick up a desired die 100 while its address is entered into the memory. The collet 80 is indexed with the sorting turret 38 and carries the die until the collet arrives at a predetermined deposit station which may comprise a container or a packaging mechanism. In any event a plurality of these deposit stations are located in evenly spaced angular relation about the turret and when the collet with the die arrives at the correct station the die is deposited. A container or packaging unit is located at each receiving station and the dies are collected according to their categories.

The mechanism for separating the selected die from the pressure-sensitive web 24 is comprised of a reciprocating needle 102 located below the web 24 for registration with a collet 80 which indexes into and out of position above the wafer array as the turret 38 indexes. The needle 102 may be reciprocated by any one of a variety of techniques such as a rotary cam, a pneumatic or hydraulic cylinder or by means of a solenoid. The needle is formed with a slightly rounded tip which, upon reciprocation, comes up under each die 100 forcing it upward away from the web and into a conical annular recess 104, slightly larger than the die 100, formed in the lower end of the collet 80. The collet 80 is formed with a central passage 106 connected to a vacuum source whereby when an individual die 100 is transferred from the web to the collet it will be held there until subsequently deposited at a selected deposit station.

The collet 80 is located on the outer end of a pair of parallel leaf springs 108 and 110 extending out from the turret and located below a radial arm 112. The arm 112 is provided with an upright plunger 114 which is adapted to engage an eccentric rotor 116 driven by a rotary solenoid 118. When the collet 80 is in position over the selected die, a signal is sent to the solenoid causing the eccentric rotor 116 to rotate, this in turn causing the plunger 114 to be depressed, forcing the collet 80 down against the selected die which is pushed up simultaneously by the needle. Continued rotation of the rotor 116 permits the collet to retract with the die and the turret is then indexed bringing the next collet 80 to bear above the next die which has been moved into position by the XY table. When the collet with its die reaches a preselected deposit station the die is released.

A small XY stage 111 is drivingly connected to the optical head 36 and operated by separate stepping motors 113 and 115 for making minor corrections to the alignment between the lens and the code pattern as will presently appear.

Optical Recording

The optical recording techniques employed in the system are somewhat similar to multichannel magnetic tape recording. However, the technique herein employs photographic film to record light or dark spots as logic signals which can be stored indefinitely and read out at will. A block of data is recorded in a field typically 0.015 inches square. This field, shown enlarged in FIG. 9, is divided into two major areas which may be defined as a parking area 120 and a data area 122. The parking area, as shown, is an area 5x15 mils. in which the reading scanner will rest between indexes. Since reading is accomplished by three spots of an equivalent diameter of 1 mil., the tolerance in indexing for reading is plus or minus 2 mils. in any direction. The data area 122 is divided into three major rows 124, 126 and 128 in the direction of travel. When the film passes under the reading head 36, three sensors in either bank of photodiodes 92 and 94 detect the variation between light and dark areas and issue the corresponding signals in the appropriate channels. Channel allocation and reading head configurations are illustrated in FIG. 10. The technique used in the data readout is similar to the NRZI technique (Non Return to Zero I) used in magnetic recording.

In this method the detection system is used to detect light changes rather than light level. In other words, the system detects transitions from light to dark or dark to light and signals a transition as a logical 1 and no transition as a logical 0. Therefore, the channels on the film record are the lines at which the transitions will occur. It is worthwhile noting that a transition is a logical 1 regardless of its polarity, i.e. a change from light to dark or dark to light will both be a logical 1. In FIG. 11 both A and B contain a logical 1 on channel 2. However, A contains a logical 0 on channel 1 and a logical 1 on channel 3 while B contains a logical 1 on channel 1 and a logical 0 on channel 3. Note that row 126 in FIG. 10 contains only one channel (channel 4) the other two channels being used for machine control purposes, the two blocks always being dark as shown.

Recording is performed while the film is stationary while reading is done when the film is moving producing an AC signal. In order to maintain channel location regardless of the direction of travel, the reading circuitry will invert the signal sequence appropriately so that all the data appears in the same visual form.

Since reading is performed in both directions of travel, the reading head contains six photo sensors arranged in the two banks 92 and 94 so that the leading bank is always reading the data in a particular direction of travel. Switching between the two banks of sensors is performed automatically by the machine's logic. The timing signal is generated by the first transition occurring in row 126. Since this block is always black and the parking area is always white this signal will appear in either direction of travel. This signal starts a master clock controlled by the oscillator driving the XY table thereby generating gating signals that are always in time with the table speed. Turnaround signals are generated at each line and recorded as a block 145 in the parking area as shown in FIG. 5. Two blocks will appear in each line allowing an extra index so that data will not be lost a turnaround. During turnaround recording, data will not be recorded.

Positioning Compensation

In order to allow for variations in positioning, larger than the plus or minus 2 mils. called for previously, a compensating network will return the reading spots to the center of the parking area. To accomplish this, the reading lens is mounted on the small XY stage 111 referred to above capable of 1 mil. steps upon command. A timing signal is generated at the beginning of each index command and compared to the time taken to reach the first transition line. Any deviation will generate a pulse in the appropriate direction driving the lens stage. This movement will result in returning the reading spot to the center of the parking area. Compensation in the direction of travel is achieved at each index while compensation in the other axis is derived in a similar manner from the turnaround block at the end of each line as shown in FIG. 14. Before the beginning of a complete frame, a manual reset signal will return the lens stage to a start position.

Die Indexer

Referring now more particularly to FIG. 7, there is shown in detail a die-indexing apparatus such as may be arrayed at each deposit station 42, as broadly shown in FIG. 1. The die-indexing mechanism of FIG. 7 may be used both to package individual dies as well as to remove dies from the packages for subsequent operations such as bonding, for example. In the illustrated embodiment of FIG. 1, one indexer is located at each deposit station so that each indexer will serve to package dies all having the same quality and characteristics.

Figure 8:
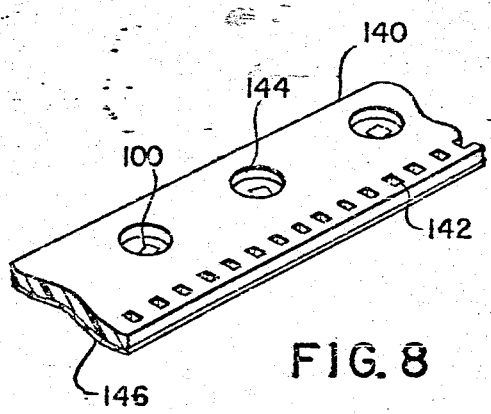
FIG. 8 is a detail perspective view showing a portion of a packaging tape made in accordance with the invention, and, FIGS. 9 through 14 illustrate code patterns employed in conjunction with this invention.

Used in the indexer is a strip 140, shown best in FIG. 8, comprised of a relatively narrow strip formed with indexing holes 142 along one edge, in a manner similar to movie film, and storage holes 144 near the other edge of the strip. On the bottom side, a thin, pressure-sensitive adhesive tape 146 is laminated to the strip 140 The adhesive tape thus provides an adhesive floor at the bottom of the storage holes 144. The laminated strip is wound on a feed reel 148 which is mounted to the indexer as by a shaft 150 provided on a frame 152. The strip 140 is threaded over an indexing track provided on the indexer to a takeup reel 154.

The indexer includes a sprocket drive 156 and contoured guide plates 158 and 160 which feed the strip 140 onto the upper reach of the indexer before delivering the strip to the reel 154. A motor or solenoid 162 is employed to actuate the indexer. The strip is carried to the upper reach of the indexer where a storage cavity 144 will come into register with a collet 80 and, assuming that the die carried by the collet 80 is addressed for this particular indexer, the die will be deposited in the strip cavity. A signal will then be generated to the solenoid 162 to advance the strip so that another strip cavity will be brought into position for the next die. As the strip cavities are filled, the strip will be wound up on the reel 154, which is drivingly connected to the feed reel 148, the two reels rotating in unison. When the strip is completely indexed and contains a device in each cavity all of the dies of the strip will be of the same category.

The indexer, as previously indicated, may be used to remove the dies from the packaging strip as well as to package them. When employed to remove the dies from the strip a reciprocating needle 164 is employed to function in a manner similar to the needle 102 of FIGS. 5 and 6. This needle is mounted upright to a block 166 supported on parallel springs 168 and 170 and reciprocated by means of a pivotally mounted arm 172 urged downwardly by means of a spring 174 and pivoted upwardly by means of a cam 176. It will be understood that each time the cam 176 is rotated, the arm 172 will pivot upwardly forcing the needle 164 up through the adhesive floor of the strip cavity, forcing the die contained therein upwardly into a vacuum collet such as shown at 80 in FIG. 6 which then may be used to transfer the die to a bonding station.

Having thus described the invention what we claim and desire to obtain by Letters Patent of the United States is:

We claim:

1. The method of sorting semiconductor devices from a monolithic wafer of said devices, comprising the steps of
    a. testing each of said devices and obtaining data specifying the characteristics of said devices,
    b. electro-optically encoding said data on a recording stratum as coded images, one each of said coded images denoting the characteristics of one each of said devices, said coded images arranged in an array related to said monolithic wafer,
    c. dividing said devices from one another while maintaining their orientation, and then
    d. sorting said devices from one another according to said characteristics as presented by said coded images.

2. The method of claim 1 wherein said dividing step includes scoring said wafer, mounting said wafer on the adhesive face of a flexible web, and bending said wafer along the scorelines to break said devices apart.

3. The method of claim 2 wherein said devices are removed from said web by first displacing a device from the plane of said wafer in a direction away from said web by pressure on said web opposite said device and then pulling said device free of said adhesive face.

4. The method of claim 1 including the step of packaging like devices after they have been sorted.

5. The method of claim 1 wherein said encoding steps includes producing projectable coded images corresponding in positional arrangement with said devices.

6. The method of claim 5 wherein said sorting step includes projecting said coded images and converting said images into electrical signals.

7. The method of claim 5 including the step of mounting said projectable images and the divided devices in side-by-side relation.

8. A system for sorting semiconductor devices from a monolithic wafer of devices, comprising a. a test station for testing each device to determine its characteristics,
    b. an electro-optical encoder operatively connected to said test station for producing on a single sheet coded images containing test data of said devices,
    c. a dividing station for dividing said devices while maintaining their orientation,
    d. a reading station including an electro-optical decoder for reading the images on said sheet and producing electrical signals thereby and,
    e. a sorting station responsive to said reading station for separating said devices from said wafer and delivering to collection stations of like devices.

9. A system according to claim 8 including a mounting station for mounting said sheet and the divided wafer in side-by-side relation to a common frame.

10. The method of sorting semiconductor devices from a monolithic wafer of said devices, comprising the steps of
    a. testing each of said devices and obtaining characteristics signals thereby,
    b. electro-optically encoding said signals into recorded instructions and producing projectable coded images corresponding in positional arrangement with said devices,
    c. dividing said devices from one another while maintaining their orientation,
    d. mounting said projectable images and the divided devices in side-by-side relation, and
    e. sorting said devices from one another in accordance with said recorded instructions.

11. A system for sorting semiconductor devices from a monolithic wafer of devices, comprising
    a. a test station for testing each device to determine its characteristics,
    b. an electro-optical encoder operatively connected to said test station for producing on a sheet coded images containing test data of said devices,
    c. a dividing station for dividing said devices while maintaining their orientation,
    d. a reading station including an electro-optical decoder for reading the images on said sheet and producing electrical signals thereby,
    e. a mounting station for mounting said sheet and the divided wafer in side-by-side relation to a common frame, and
    f. a sorting station responsive to said reading station for separating said devices from said wafer and delivering to collection stations of like devices.